US012429173B2

(12) United States Patent
Schaich

(10) Patent No.: US 12,429,173 B2
(45) Date of Patent: *Sep. 30, 2025

(54) TANK DEVICE FOR STORING A GASEOUS MEDIUM, COMPRISING A VALVE DEVICE

(71) Applicant: Robert Bosch GmbH, Stuttgart (DE)

(72) Inventor: Udo Schaich, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 301 days.

This patent is subject to a terminal disclaimer.

(21) Appl. No.: 18/245,314

(22) PCT Filed: Aug. 19, 2021

(86) PCT No.: PCT/EP2021/073000
§ 371 (c)(1),
(2) Date: Mar. 14, 2023

(87) PCT Pub. No.: WO2022/063493
PCT Pub. Date: Mar. 31, 2022

(65) Prior Publication Data
US 2023/0358366 A1    Nov. 9, 2023

(30) Foreign Application Priority Data
Sep. 23, 2020    (DE) ...................... 10 2020 211 865.5

(51) Int. Cl.
*F17C 13/04*    (2006.01)
*F16K 31/42*    (2006.01)
(Continued)

(52) U.S. Cl.
CPC .............. *F17C 13/04* (2013.01); *F16K 31/42* (2013.01); *H01M 8/04089* (2013.01);
(Continued)

(58) Field of Classification Search
CPC . F17C 13/04; F17C 2205/0326; F16K 31/408
See application file for complete search history.

(56) References Cited

U.S. PATENT DOCUMENTS

| 4,540,154 A | 9/1985 | Kolchinsky et al. |
| 5,169,117 A | 12/1992 | Huang |

(Continued)

FOREIGN PATENT DOCUMENTS

| DE | 102012210943 A1 | 1/2014 |
| DE | 102018201055 A1 | 7/2019 |

(Continued)

OTHER PUBLICATIONS

JP2009210120_English_Machine_Translation (Year: 2009).*

(Continued)

*Primary Examiner* — Reinaldo Sanchez-Medina
*Assistant Examiner* — Nicole Gardner
(74) *Attorney, Agent, or Firm* — Michael Best & Friedrich LLP

(57) ABSTRACT

A tank device for storing a gaseous medium includes a valve device and a tank. The valve device includes a valve housing with a pilot valve element. The pilot valve element interacts with a first seal seat and thus forms a pilot valve, wherein the pilot valve element can be moved by a solenoid coil. Furthermore, the valve housing includes a main valve element which interacts with a second seal seat and thus forms a main valve. The pilot valve element additionally has a transverse bore perpendicularly to the longitudinal axis of the tank device, said transverse bore opening into a transverse bore of the main valve element arranged perpendicularly to the longitudinal axis of the tank device. A driver element is at least partly arranged in the transverse bore of the pilot valve element and in the transverse bore of the main valve element.

15 Claims, 1 Drawing Sheet

(51) Int. Cl.
  *H01M 8/04082* (2016.01)
  *H01M 8/04089* (2016.01)
(52) U.S. Cl.
  CPC . *H01M 8/04201* (2013.01); *F17C 2205/0323* (2013.01); *F17C 2221/012* (2013.01); *F17C 2270/0168* (2013.01); *F17C 2270/0184* (2013.01); *H01M 2250/20* (2013.01)

(56) References Cited

U.S. PATENT DOCUMENTS

| | | | |
|---|---|---|---|
| 5,197,710 | A | 3/1993 | Wass et al. |
| 6,830,230 | B2 | 12/2004 | Simoens |
| 6,962,317 | B2 | 11/2005 | Simoens |
| 7,080,817 | B2 | 7/2006 | Stern |
| 8,151,819 | B2 | 4/2012 | Suzuki et al. |
| 10,161,360 | B2 | 12/2018 | Ninomiya et al. |
| 11,619,319 | B2 | 4/2023 | Beier et al. |
| 11,808,552 | B1 | 11/2023 | Italia |
| 2007/0090317 | A1 | 4/2007 | Kamiya et al. |
| 2009/0236551 | A1 | 9/2009 | Nomichi et al. |
| 2011/0068286 | A1 | 3/2011 | Nomichi et al. |
| 2012/0199775 | A1 | 8/2012 | Watanabe |
| 2016/0208954 | A1 | 7/2016 | Ito et al. |
| 2016/0305572 | A1 | 10/2016 | Becker et al. |

FOREIGN PATENT DOCUMENTS

| | | |
|---|---|---|
| EP | 0195206 A1 | 9/1986 |
| EP | 0668468 B1 | 9/1999 |
| FR | 2544834 A1 | 10/1984 |
| JP | 2002039429 A | 2/2002 |
| JP | 2009210120 A | 9/2009 |
| JP | 2010121728 A | 6/2010 |
| JP | 2012189107 A | 10/2012 |
| JP | 2014214804 A | 11/2014 |
| JP | 2023526126 A | 6/2023 |
| JP | 2023539904 A | 9/2023 |
| JP | 2023539911 A | 9/2023 |
| KR | 100766872 B1 | 10/2007 |
| KR | 20140079627 A | 6/2014 |
| WO | 2013031191 A1 | 3/2013 |
| WO | 2015129159 A1 | 9/2015 |

OTHER PUBLICATIONS

Translation of International Search Report for Application No. PCT/EP2021/073000 dated Dec. 1, 2021 (3 pages).

Office of Energy Efficiency & Renewable Energy, "Fuel Cells," <https://www.energy.gov/eere/fuelcells/fuel-cells#:~:text=A%20fule%20cell%20consists%20of,is%20fed%20to%20the%20cathode> web page visited Apr. 29, 2024 (4 pages).

* cited by examiner

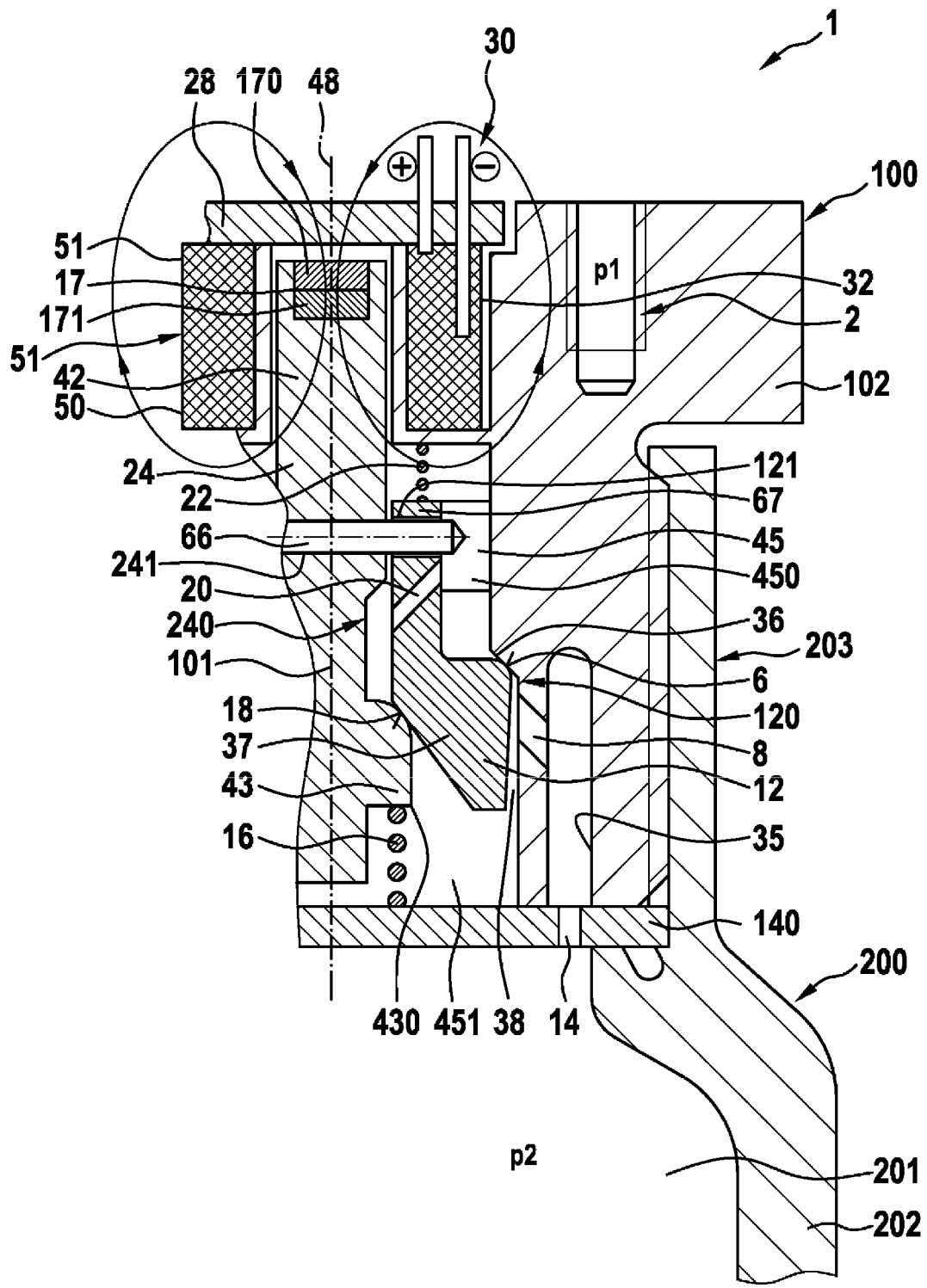

TANK DEVICE FOR STORING A GASEOUS MEDIUM, COMPRISING A VALVE DEVICE

BACKGROUND

The invention relates to a tank device comprising a valve device, in particular for storing hydrogen, for example for use in vehicles with a fuel cell drive or in vehicles with a hydrogen combustion engine as a drive.

DE 10 2018 201 055 A1 describes a tank device comprising at least one storage unit, which comprises a control valve and which is connected via a line system to an output line. At least one control valve of at least one storage unit is designed as a main valve, and at least one control valve of at least one storage unit is designed as a secondary valve, wherein the main valve and the secondary valve are of different designs.

The safety devices for such a tank device are standardized. Each tank device must have such a shut-off valve. In the event of damage to the tank device caused by the vehicle with a fuel cell drive, for example, being in an accident or in the event of a line of the tank device rupturing, the shut-off valve can seal the tank so that gas cannot escape from the tank device.

Due to the high safety requirements placed on the shut-off valves and due to the high system pressures of, for example, 800 bar or more, such shut-off valves are structurally very challenging and have a large installation space. This in turn increases the total weight of the entire tank device which, in the event of the vehicle with a fuel cell drive, for example, being in an accident, can lead to high acceleration forces occurring and possible deformations of the valve device or the tank device.

SUMMARY

In contrast, the tank device according to the invention has the advantage that, in a structurally simple and cost-saving manner, a tank device is provided which has a compact safety valve with low opening forces.

For this purpose, the tank device has a valve device and a tank for storing a gaseous medium, in particular hydrogen. The valve device comprises a valve housing, in which valve housing a pilot valve element, which can be moved along a longitudinal axis of the tank device, is arranged. The pilot valve element interacts with a first seal seat for opening and closing a through-opening and thus forms a pilot valve. Furthermore, the valve device comprises a solenoid coil, by means of which solenoid coil the pilot valve element can be moved along the longitudinal axis of the tank device. A main valve element is arranged in the valve housing, which main valve element interacts with a second seal seat for opening and closing a through-opening and thus forms a main valve, wherein the second seal seat is formed as a conical protrusion on the valve housing. Furthermore, the pilot valve element has a transverse bore perpendicularly to the longitudinal axis of the tank device. Said transverse bore of the pilot valve element opens into a transverse bore of the main valve element arranged perpendicularly to the longitudinal axis of the tank device. In addition, a driver element is at least partly arranged in the transverse bore of the pilot valve element and in the transverse bore of the main valve element.

In this way, the efficiency and the mode of operation of the valve device can be optimized, while at the same time saving costs, by minimizing the magnetic forces needed for the opening of the valve device. Furthermore, the magnetic circuit is improved by an optimum design of the magnetic flux based on optimized material selection, the cross-sectional dimensions and the design of the surface structures of the valve device, and thus a compact and cost-effective valve device is achieved.

In a first advantageous development, the driver element is pin-shaped. The geometric design of the driver element is adapted according to the required functions, so that optimal functioning of the entire valve device is achieved.

In an advantageous development, a permanent magnet is arranged at one end of the pilot valve element, which permanent magnet is arranged in the valve device in such a way that a positive pole element of the permanent magnet is arranged in the direction of a housing cover of the valve device and a negative pole element of the permanent magnet is arranged in the direction of the tank. Furthermore, the permanent magnet is arranged in a positive pole region of a permanent magnetic field generated by the solenoid coil when the solenoid coil is energized.

An optimal design of the magnetic flux can thus be achieved in a simple manner. In addition, a two-stage opening process requires only minimal magnetic force to open the valve device. Minimal power and energy requirement and therefore a positive energy balance is thus achieved.

In a further embodiment of the invention, it is advantageously provided that the valve device can be opened in the direction of the tank when the solenoid coil is energized. A structurally simple and cost-effective tank device is thus achieved. This embodiment also makes it possible to remove the electrically guided parts and the magnets from the regions in which media flows, without having to apply complex sealing designs.

In a further embodiment of the invention, it is advantageously provided that, between the valve housing and an integrally formed portion of the main valve element, which integrally formed portion interacts with the second seal seat for opening and closing the through-opening, a throttle duct is formed, which throttle duct comprises a conical expansion counter to the direction of the second seal seat, as a result of which a throttling effect is formed.

In an advantageous development of the invention, it is provided that the through-opening in the valve housing is formed at the level of the throttle duct and opens into the throttle duct. A chamber is advantageously formed in the valve housing, which chamber is connected to the throttle duct by means of the through-opening. The opening process of the valve device is thus facilitated in a structurally simple manner.

In an advantageous development of the invention, it is advantageously provided that the valve device is arranged in a neck region of the tank device and is pressed against a tank floor within the neck region. Due to the structural design of the valve device within the neck region, a smaller pressure application area is achieved, which results in lower axial compressive forces. At high pressures, smaller pressure application areas constitute a high level of relief in terms of component loads, which is reflected in lower deformations, less wear and fewer density influences, and increased service life of the entire tank device and of the valve device.

In a further embodiment of the invention, it is advantageously provided that a discharge opening is formed in the tank floor, which discharge opening fluidically connects a tank interior and the chamber to one another. In a structurally simple manner, the interior of the valve device can thus be connected to a tank interior of the tank device.

In an advantageous development of the invention, it is provided that the pilot valve element comprises a protrusion, on which protrusion a spring is supported and the pilot valve element is subjected to a force in the direction of one end of the pilot valve element.

In an advantageous development of the invention, it is provided that the main valve element is subjected to a force in the direction of the tank interior by means of a spring, as a result of which the main valve element is subjected to a force in the direction of the first seal seat and counter to the direction of the second seal seat.

In a further embodiment of the invention, it is advantageously provided that an interior is formed in the valve housing, which interior is divided by the main valve element into a first partial interior and a second partial interior.

In an advantageous development of the invention, it is provided that the first partial interior is connected to a supply line by means of a discharge channel formed in the valve housing, which supply line can be connected to a supply region of a consumer system.

As a result, the opening process of the valve device can be facilitated, which opening process requires low magnetic forces since the opening process is assisted by pneumatic forces due to the structural design of the valve device.

The tank device described is preferably suitable for storing hydrogen for operating a fuel cell in a fuel cell system.

The tank device described for storing hydrogen for operating a fuel cell can furthermore be used advantageously in a fuel-cell-powered vehicle.

The described device for storing hydrogen can furthermore be used advantageously in a hydrogen-powered vehicle, i.e., in a vehicle with a hydrogen combustion engine as a drive.

BRIEF DESCRIPTION OF THE DRAWINGS

The drawing shows an exemplary embodiment of a tank device according to the invention for storing a gaseous medium, in particular hydrogen. The drawing shows:

FIG. 1 an exemplary embodiment of a tank device according to the invention with a valve device in longitudinal section.

DETAILED DESCRIPTION

FIG. 1 shows an exemplary embodiment of a tank device 1 according to the invention with a longitudinal axis 48 in longitudinal section and in a simplified view, wherein the tank device 1 is rotationally symmetrical about the longitudinal axis 48.

The tank device 1 comprises a tank 200 and a valve device 100, wherein the valve device 100 is partially accommodated in the tank 200. The tank 200 has a tank housing 202 in which a tank interior 201 is formed.

Furthermore, the tank 200 has a neck region 203 in which the valve device 100 is partly accommodated. In this case, the valve device 100 is supported on a tank floor 140, which is arranged between the neck region 203 and the tank interior 201 and thus the tank interior 201 is delimited from the neck region 203.

The valve device 100 comprises a valve housing 102, in which a solenoid coil 32 is arranged, which can be supplied with current by means of an electrical connection 30. In this case, the electrical connection 30 is embodied in a magnetizable housing cover 28.

A permanent magnet 17, which has a positive pole element 170 and a negative pole element 171, is arranged at one end 42 of the pilot valve element 24. The positive pole element 170 of the permanent magnet 17 in this case points in the direction of the housing cover 28 of the valve device 100 and the negative pole element 171 of the permanent magnet 17 is arranged in the direction of the tank 200. Furthermore, the permanent magnet 17 is arranged in the valve device 100 in such a way that when the solenoid coil 32 is energized, said permanent magnet is arranged in a positive pole region 51 of a permanent magnetic field 52 generated by the solenoid coil 32.

In addition, the housing cover 28 is produced here from a non-magnetic material in order to guide the magnetic force fields and thus the direction of movement of the pilot valve element 24 in the direction of the tank interior 201 when the solenoid coil 32 is energized.

Furthermore, an interior 45 is formed in the valve housing 102, in which interior a pilot valve element 24 and a main valve element 12 are arranged.

The pilot valve element 24 is arranged coaxially with respect to the longitudinal axis 48 and comprises stepped recesses and a rounded protrusion 43, which is formed at an opposite end as step 430. On this step 430 a spring 16 is supported, which is also supported on the tank floor 140 and which subjects the pilot valve element 24 to a force in the direction of the solenoid coil 32, in FIG. 1 at the top.

A main valve element 12 is arranged in parallel with the pilot valve element 24, which main valve element is substantially L-shaped with an integrally formed portion 37. In addition, the main valve element 12 comprises a through-opening 20 through which a first partial interior 450 and a second partial interior 451 can be fluidically connected. The interior 45 is divided by the main valve element 12 into the first partial interior 450 and the second partial interior 451.

The main valve element 12 is pretensioned by a spring 22 and is pressed by the latter against the rounded protrusion 43, wherein the spring 22 is supported on the valve housing 102. A first seal seat 18 is thus formed on the main valve element 12, which, together with the main valve element 12, interacts with the main valve element 12 for opening and closing a connection between the first partial interior 450 and the second partial interior 451 and thus for opening and closing the through-opening 20 and thus forms a pilot valve 240.

By means of the pilot valve element 24, the main valve element 12 is subjected to a force counter to the force of the spring 22 and is thus pressed with its integrally formed portion 37 against a second seal seat 6, which is conically formed on the valve housing 102. The closing force is supported by the pressure in the tank interior 201 and the force of the spring 16. The closing force ensures secure closing of the main valve element 12 in the switched-off and non-energized state. As a result, the main valve element 12 interacts with the second seal seat 18 for opening and closing a through-opening 8 formed in the valve housing 102 and thus forms a main valve 120.

Between the valve housing 102 and the integrally formed portion 37 of the main valve element 12, a throttle duct 38 is formed, which has a conical expansion counter to the direction of the second seal seat 6, as a result of which a throttling effect is formed.

The through-opening 8 is formed at the level of the throttle duct 38 and opens into the throttle duct 38. Furthermore, the through-opening 8 opens into a chamber 35 formed in the valve housing 102, which chamber is connected to the tank interior 201 via discharge openings 14 formed in the tank floor 140.

The first partial interior 450 is connected by means of a discharge channel 2 formed in the valve housing 102 to a supply line 40, which can be connected to a supply region of a consumer system. The system pressure $p_1$ forms in the discharge channel 2.

Furthermore, the pilot valve element 24 has a transverse bore 241 perpendicular to the longitudinal axis 48 of the tank device 1. The main valve element 12 additionally has a transverse bore 121 which is arranged perpendicularly to the longitudinal axis 48 and opens into the transverse bore 241 of the pilot valve element 24. A pin-shaped driver element 66 is arranged in the transverse bore 241 of the pilot valve element 24 and in the transverse bore 121 of the main valve element 120. The driver element 66 also projects into the first partial interior 450.

Geometrically further embodiments of the driver element 66 are also possible in addition to the pin-shaped design, such as, for example, an elliptical, circular-cylindrical or polygonal embodiment in cross section.

The mode of operation of the tank device 1 is as follows: In the de-energized state of the solenoid coil 32, the first seal seat 18 and the second seal seat 6 are closed, so that no gaseous medium, here hydrogen, can flow out of the tank interior 202 via the valve device 100 into the supply line 40, for example in the direction of a supply region of the consumer system.

When the solenoid coil 32 is energized via the electrical connection 30, a permanent magnetic field 52 is formed, which has a positive pole region 51 and a negative pole region 50. The permanent magnet 17 is in the positive pole region 51 of the permanent magnetic field 52 generated by the solenoid coil 32. Due to the mutually repelling magnetic forces of the permanent magnet 17 in the permanent magnetic field 52, the pilot valve element 24 moves away from the housing cover 28 and thus compresses the spring 16. The longitudinal movement of the pilot valve element 24 leads to it lifting off from the first seal seat 18 and thus releasing an opening cross section from the second partial interior 451 into the first partial interior 450 and the through-opening 20.

The second partial interior 451 is fluidically connected to the tank interior 201 via the discharge opening 14, the chamber 35, the through-opening 8 and the throttle duct 38, so that the tank interior is filled with hydrogen. Due to the hydrogen flowing off in the direction of the discharge channel 2 and thus into the supply line 40, a compensating pressure level around the main valve element 12 is formed by the pressure system depending on the medium removal.

As a result of the structural embodiment of the throttle duct 38 as a throttle, more medium, here hydrogen, can flow off via the through-opening 20 during the opening process than can flow through the throttle duct 38. In this way, an additional opening force acts on the main valve element 12. In addition, the pressure in the second partial interior 451 is reduced.

After a short opening time of the first seal seat 18, the pilot valve element 24 is pressure-compensated, leading to a pressure balance of the main valve element 12.

The force of the spring 22 supports the release of the second seal seat 6 since said force presses the main valve element 12 in opening force, so that the main valve element 12 lifts off from the second seal seat 6 and releases an opening cross-section between the through-opening 8 and the first partial interior 450. Thus, hydrogen now flows from the tank interior 201 via the through-opening 8 directly into the first partial interior 450 in the direction of the discharge channel 2 and thus into the supply line 40.

In addition to the pneumatic pressure conditions, the main valve element 12 is pulled with a time delay out of the second seal seat 6 in a non-positive manner via the pilot valve element 24 with the aid of the mechanical driver element 66.

Thus, the first seal seat 18 and the second seal seat 6 are now released and, via both opening cross-sections, hydrogen flows out of the tank interior 201 via the valve device 1 into the supply line 40, for example in the direction of the supply region of the consumer system.

If the opening cross-section on the first seal seat 18 is smaller than the opening cross section on the second seal seat 6, only small magnetic forces are required for the opening process of the pilot valve element 24 on the first seal seat 18.

If the energizing of the solenoid coil 32 is interrupted, the permanent magnetic field 52 and thus the repulsive magnetic forces of the permanent magnet 17 and of the permanent magnetic field 52 of the solenoid coil 32 collapse and a closing force is introduced via the spring 16 onto the pilot valve element 24 and the main valve element 12. Depending on the pressure $p_2$, such as, for example, 15 to 1000 bar, in the tank interior 201, the closing force, together with the pressure in the neck region 203 of the tank device 1, is introduced via the pilot valve element 24 and the first seal seat 18 to the main valve element 12 with the second seal seat 6.

Both the first seal seat 18 and the second seal seat 6 are now blocked again, so that no more hydrogen can flow out of the tank interior 201 via the valve device 100, for example in the direction of the supply region of the consumer system. This principle of autonomous closing also works in the event of an emergency, when the power supply is interrupted. However, it should be noted here that the force of the spring 22, which acts counter to the desired flow of force, must not be selected too high and must be adapted accordingly. In an emergency, it is thus ensured that no hydrogen can escape from the tank device 1.

In the case of refueling, the discharge channel 2 is supplied with pressure via a connected tank unit, for example a filling station. The prevailing pressure in the discharge channel 2 is greater than in the remaining valve device 100. Due to the different pressure level, the pressure ratio at the second seal seat 6 is greater than in the remaining valve device 100, so that the main valve element 12 presses the pilot valve element 24 counter to the force of the spring 16 in the direction of the tank interior 201. The tank device 1 can now be filled via the released second seal seat 6 and via the through-opening 8 until the refueling operation is completed. If the refueling operation is ended, no further filling takes place so that the pressure around the main valve element 12 balances. The force of the spring 16, together with the resulting differential pressure from $p_2 > p_1$, again ensures the closing of the first seal seat 18 and of the second seal seat 6.

In addition to fuel-cell-operated vehicles, the tank device 1 for storing a gaseous medium can also be used, for example, for hydrogen storage in vehicles with a hydrogen combustion engine as a drive.

What is claimed is:

1. A tank device (1) for storing a gaseous medium comprising a valve device (100) and a tank (200), wherein the valve device (100) comprises a valve housing (102), in which valve housing (102) a pilot valve element (24), which can be moved along a longitudinal axis (48) of the tank device (100), is arranged, which pilot valve element (24) interacts with a first seal seat (18) for opening and closing a first through-opening (20) and thus forms a pilot valve (240), wherein the valve device (100) comprises a solenoid coil (32) operable to move the pilot valve element (24) along the longitudinal axis (48), wherein a main valve element (12) is arranged in the valve housing (102), which main valve element (12) interacts with a second seal seat (6) for opening and closing a second through-opening (8) and thus forms a main valve (120), wherein the second seal seat (6) is configured as a conical protrusion (36) on the valve housing (102), wherein the pilot valve element (24) has a transverse bore (241) perpendicular to the longitudinal axis (48) of the tank device (1), said transverse bore (241) of the pilot valve element (24) opening into a transverse bore (121) of the main valve element (12) arranged perpendicularly to the longitudinal axis (48) of the tank device (1), wherein a driver element (66) is at least partly arranged in the transverse bore (241) of the pilot valve element (24) and in the transverse bore (121) of the main valve element, wherein the main valve element (12) is subjected to a force in a direction of a tank interior (201) by a spring (22), as a result of which the main valve element (12) is subjected to a force in a direction of the first seal seat (18) and counter to a direction of the second seal seat (6).

2. The tank device (1) according to claim 1, wherein the driver element (66) is pin-shaped.

3. The tank device (1) according to claim 1, wherein a permanent magnet (17) is arranged at one end (42) of the pilot valve element (24), which permanent magnet (17) is arranged in the valve device (100) such that a positive pole element (170) of the permanent magnet (17) is arranged in a direction of a housing cover (28) of the valve device (100) and a negative pole element (171) of the permanent magnet (17) is arranged in a direction of the tank (200), wherein, when the solenoid coil (32) is energized, the permanent magnet (17) is arranged in a positive pole region (51) of a permanent magnetic field (52) generated by the solenoid coil (32).

4. The tank device (1) according to claim 1, wherein the valve device (100) can be opened in the direction of the tank (200) when the solenoid coil (32) is energized.

5. The tank device (1) according to claim 1, wherein, between the valve housing (102) and an integrally formed portion (37) of the main valve element (12), which integrally formed portion (37) interacts with the second seal seat (6) for opening and closing the second through-opening (8), a throttle duct (38) is formed, which throttle duct (38) comprises a conical widening toward the second through-opening (8), as a result of which a throttling effect is formed.

6. The tank device (1) according to claim 5, wherein the second through-opening (8) in the valve housing (102) is formed at a level of the throttle duct (38) and opens into the throttle duct (38).

7. The tank device (1) according to claim 5, wherein a chamber (35) is formed in the valve housing (102), which chamber (35) is connected to the throttle duct (38) by the second through-opening (8).

8. The tank device (1) according to claim 7, wherein the valve device (100) is arranged in a neck region (203) of the tank device (1) and is pressed against a tank floor (140) within the neck region (203).

9. The tank device (1) according to claim 8, wherein a discharge opening (14) is formed in the tank floor (140), which discharge opening fluidically connects the tank interior (201) and the chamber (35) to one another.

10. The tank device (1) according to claim 1, wherein the pilot valve element (24) comprises a protrusion (43), on which protrusion (43) a spring (16) is supported and the pilot valve element (24) is subjected to a force in a direction of one end (42) of the pilot valve element (24).

11. The tank device (1) according to claim 1, wherein an interior (45) is formed in the valve housing (102), which interior (45) is divided by the main valve element (12) into a first partial interior (450) and a second partial interior (451).

12. The tank device (1) according to claim 11, wherein the first partial interior (450) is connected to a supply line (40) by a discharge channel (2) formed in the valve housing (102), which supply line (40) can be connected to a supply region of a consumer system.

13. The tank device (1) according to claim 1, wherein the gaseous medium is hydrogen.

14. A fuel cell system with a tank device (1) for storing hydrogen for operating a fuel cell according to claim 1.

15. A fuel-cell-powered vehicle with a tank device (1) for storing hydrogen for operating a fuel cell according to claim 1.

* * * * *